(12) United States Patent
Ottestad et al.

(10) Patent No.: US 6,516,825 B1
(45) Date of Patent: Feb. 11, 2003

(54) METHOD AND VALVE DEVICE FOR COUNTERACTING HARMFUL PRESSURE PULSES IN A HYDRAULIC SYSTEM

(75) Inventors: Nils T. Ottestad, Tønsberg (NO); Finn Wichstrøm, Hvalstad (NO)

(73) Assignees: Aker Maritime ASA, Oslo (NO); Ottestad Breathing Systems A/S, Husoysund (NO)

( * ) Notice: Subject to any disclaimer, the term of this patent is extended or adjusted under 35 U.S.C. 154(b) by 0 days.

(21) Appl. No.: 09/807,140

(22) PCT Filed: Oct. 7, 1999

(86) PCT No.: PCT/NO99/00306

§ 371 (c)(1),
(2), (4) Date: Jul. 20, 2001

(87) PCT Pub. No.: WO00/23743

PCT Pub. Date: Apr. 27, 2000

(30) Foreign Application Priority Data

Oct. 8, 1998  (NO) ................................................ 984704

(51) Int. Cl.[7] ............................................. F16L 55/055
(52) U.S. Cl. ......................... 137/12; 137/207; 137/209; 137/490
(58) Field of Search .......................... 137/12, 207, 209, 137/490

(56) References Cited

U.S. PATENT DOCUMENTS 2,592,613 A   4/1952  Synder .......................... 138/31
3,741,692 A * 6/1973  Rupp ............................ 138/31
3,911,941 A   10/1975 Gerbic et al. ................ 137/116

FOREIGN PATENT DOCUMENTS

DE   1164764    3/1964
DE   2162320    7/1972

OTHER PUBLICATIONS

International Search Report for PCT/NO99/00306.
English Abstract for DE 2162320.

* cited by examiner

*Primary Examiner*—Gerald A. Michalsky
(74) *Attorney, Agent, or Firm*—Davidson, Davidson & Kappel, LLC

(57) ABSTRACT

A method and a valve apparatus for counteracting harmful pressure pulses caused by rapid retardation of a liquid in a hydraulic system comprising a pump for the supply of liquid to a conduit stretch containing a non-liquid-filled volume. The valve apparatus comprises a main valve having an inlet connected to a reservoir for pressurised gas, a first valve chamber connected in use to said volume, and a regulating unit for controlling the supply of pressurised gas to the first chamber. The regulating unit comprises a first device arranged to open for the supply of pressurised gas via the main valve to the first chamber when the pressure therein sinks below an activating valve, and thereafter to maintain the pressure in the chamber at a desired value, a second device causing an increased supply of pressurised gas to the first chamber when the pressure therein rises after having fallen to the activiating pressure, and a third device causing closing of the main valve and therewith shutting-off of the gas flow to the first chamber when the pressure therein has risen to a closing value.

10 Claims, 4 Drawing Sheets

Figure 1:
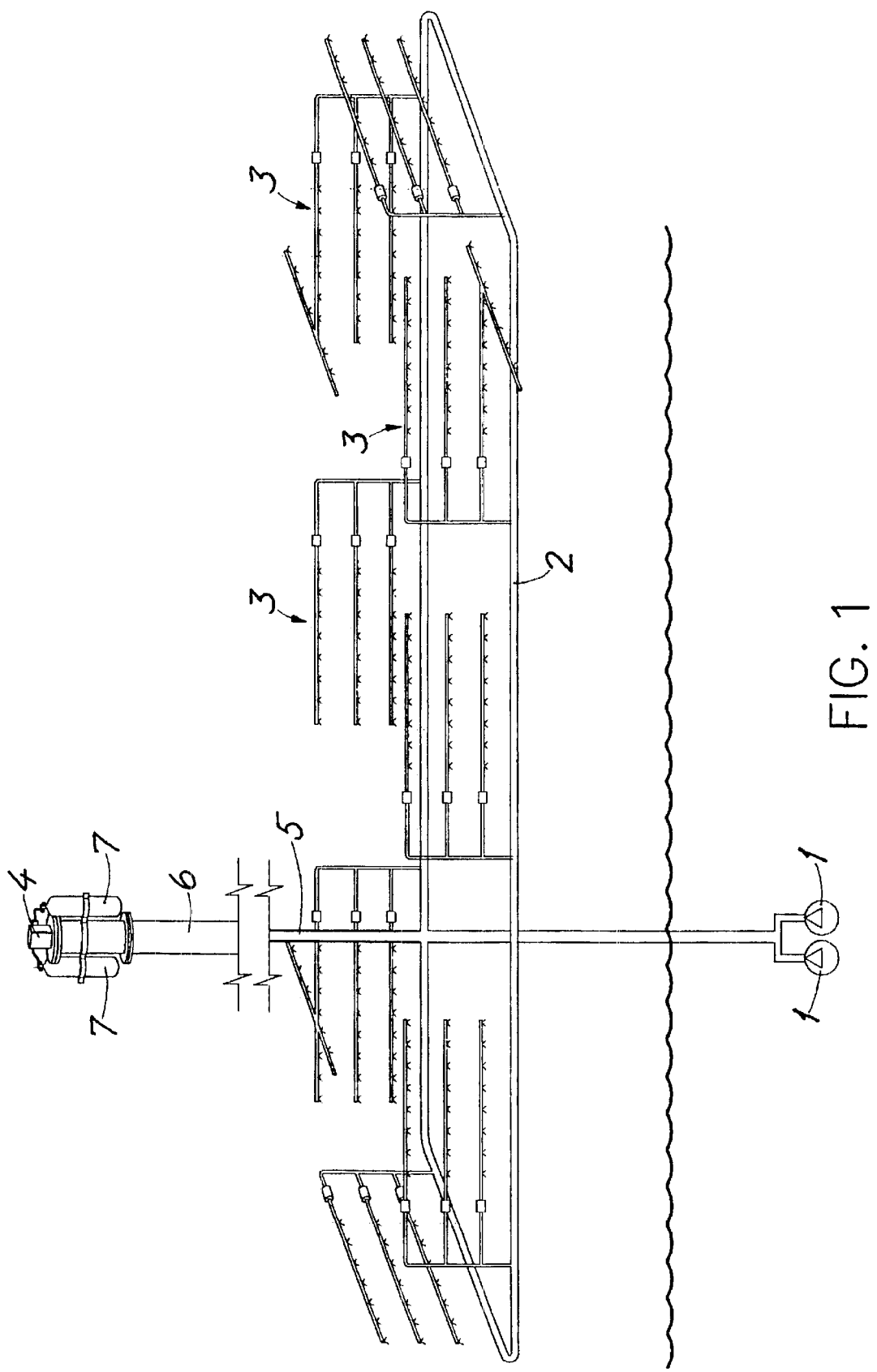

METHOD AND VALVE DEVICE FOR COUNTERACTING HARMFUL PRESSURE PULSES IN A HYDRAULIC SYSTEM

The invention relates to a method and a valve apparatus for counteracting harmful pressure pulses caused by rapid retardation of a liquid in a hydraulic system comprising a pump for the supply of liquid to a conduit stretch containing a non-liquid-filled volume.

Pressure pulses may arise in all hydraulic systems wherein a liquid is subjected to a rapid velocity change. If adequate measures are not taken, one may risk that the pressure pulses burst pipes, pumps, etc. An example of such systems is fire water systems on offshore installations. Such systems comprise high-power pumps supplying large quantities of water via ring lines at several levels to the automatic extinguishing plant forming part of the system. In these systems one may risk that the highest-lying part of the pipe system is partly gas-filled (air, water vapour etc.) at the moment when the high-power pumps start up. This is primarily due to the fact that the automatic extinguishing plant has to start up as quickly as possible in order to minimise the effect of a possible fire attempt, whereas it takes time to start up the pumps. The driving pressure of the pumps may typically be of the order of 10–15 bar, whereas the pressure in the gas-filled part of the pipe system may be substantially less than I atmosphere as the pumps start up. The gas volume therefore must be reduced to a fraction before the pneumatic counterpressure is so high that the liquid begins to retard. Consequently, the liquid will have to be slowed down over a very short stretch, and the pressure pulse will become correspondingly strong.

Traditionally, essentially four different methods are used for reducing the risk for pressure impacts in such fire water systems. One method is to use a vacuum switch which automatically admits air at atmospheric pressure into the relevant pipe as soon as water is tapped from the pipe system. The uncertainty of this method is that one is dependent on the pumps not starting before the quantity of air which has been admitted to the system, can secure a satisfactory smooth retardation of the water.

Another method is to provide a liquid-filled buffer tank in the system. When water is tapped from the system before the pumps have started, the buffer tank will supply sufficient liquid to the system to secure that a too low pressure in parts of the system does not arise.

A third method is to have an air-filled buffer tank in the system. When the pumps start up, the water will gradually fill the buffer tank, and the air in the buffer tank will be compressed and gradually cause the liquid velocity to be reduced. By choosing a suitable size of the buffer tank, one will be able to achieve that the liquid flow is slowed quietly down.

A fourth method which is used, is to place a low-lying buffer tank in the system, wherein the tank is pressurised with compressed air.

The drawbacks of these known methods are either that they do not give a sufficient security, or that they are expensive and space-demanding, or that it takes an unduly long time to achieve normal operating conditions in the fire water system.

The object of the invention is to provide a simple and cost-efficient method for counteracting harmful pressure pulses in different types of hydraulic pipe systems wherein there is a risk that the pipe system may be partly gas-filled when pumps or corresponding devices are put into function.

For achieving the above-mentioned object there is provided a method of the introductorily stated type which, according to the invention, is characterised by the steps of sensing the pressure in said volume in the conduit, supplying compressed gas to the volume when the pressure sinks below a given first level, and seeing that the pressure is maintained at a desired value which is at least equal to the first level, and shutting-off the supply of compressed gas to the volume when the pressure therein has risen to a given second level.

In an advantageous embodiment of the method an increased quantity of compressed gas is supplied to said volume when the pressure therein, as a consequence of an external influence, rises after having fallen to the first level.

According to the invention there is also provided a valve apparatus of the introductorily stated type which is characterised in that it comprises a main valve having an inlet connected to a reservoir for pressurised gas, a first valve chamber connected in use to said volume, and a regulating unit for controlling the supply of pressurised gas to the first chamber, which unit comprises a first device arranged to open for the supply of pressurised gas via the main valve to the first chamber when the pressure therein sinks under an activating value, and thereafter to maintain the pressure in the chamber at a desired value, a second device causing increased supply of pressurised gas to the first chamber when the pressure therein rises after having fallen to the activating pressure, and a third device causing closing of the main valve and therewith shutting-off of the gas flow to the first chamber when the pressure therein has risen to a closing value.

Thus, in the present invention there is used an active pneumatic system to minimise pressure impacts or surges in hydraulic systems. The method offers substantial advantages in relation to the prior art in that it is simple and inexpensive and sees that normal operating conditions are established quickly. The valve apparatus according to the invention is a regulating valve which senses when the liquid (water) is put in motion, and provides for quickly establishing a pneumatic counterpressure at the downstream side of the liquid. The movement of the liquid will cause the pneumatic pressure to increase beyond the pressure of the supplied pressurised gas, and gradually cause the liquid flow to retard. The purpose of actively supplying compressed gas at the downstream side of the liquid is to minimise the pressure pulse by seeing that the distance travelled by the liquid flow during the retardation phase, is sufficient to counteract harmful pressure pulses in the system.

In the case of a fire water system of the above-mentioned type it may, in principle, be sufficient to install only one valve apparatus at the highest point of the pipe system. This apparatus preferably should be arranged to maintain a given minimum overpressure in the pipe system. If water is tapped from the system before the pumps have been started, that part of the pipe system which is situated between the valve apparatus and a first subjacent ring line, will be able to function as a buffer volume which is gradually filled with gas. Care must be taken that this buffer volume is sufficiently large that it may not be able to be emptied completely of water before the pumps start up. By adapting the overpressure to the construction of the piping, one can avoid that gas pockets arise in other parts of the pipe system. The additional function of the valve apparatus will be to secure that the total gas quantity which is supplied to said buffer volume, is sufficient that the liquid gets such a smooth retardation that harmful pressure pulses are avoided. This is secured in that the valve apparatus observes that the pumps start up, and provides for an instantaneous supply of gas into the buffer volume, for thereafter to break the supply of gas as soon as the buffer volume has been supplied with a metered quantity of gas or the pressure of the buffer volume has reached a given level.

Figure 2:
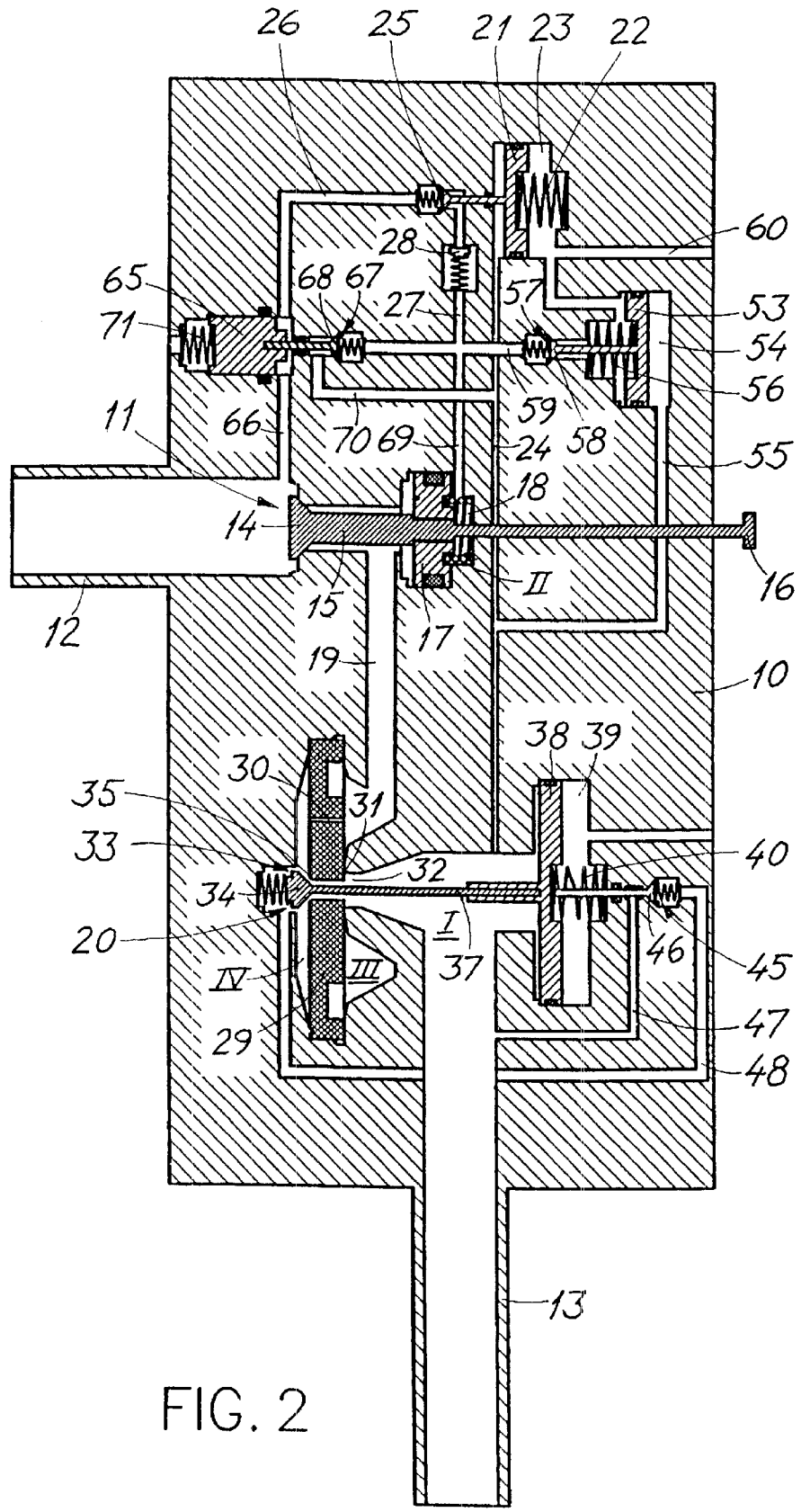
Figure 3:
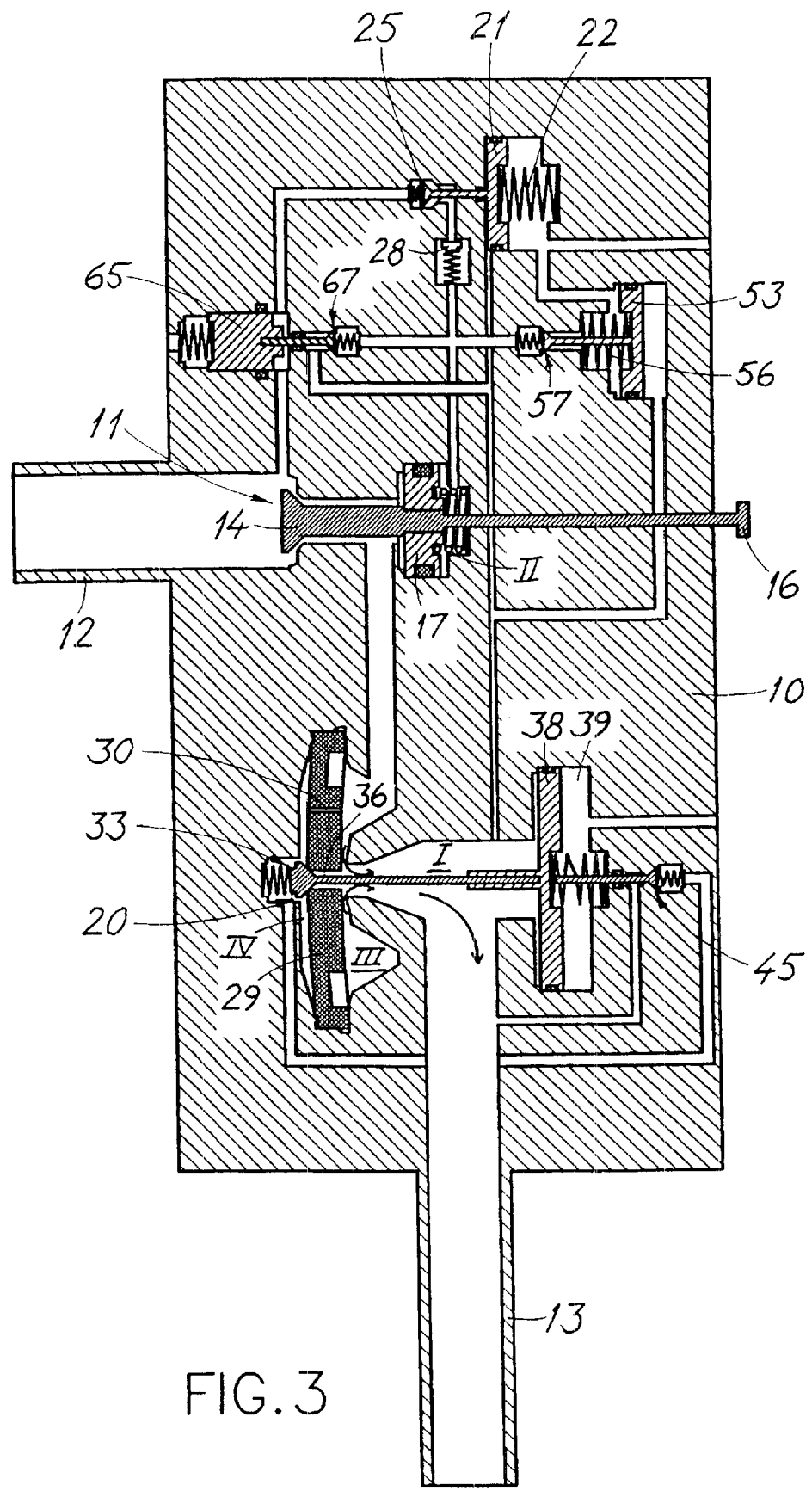
Figure 4:
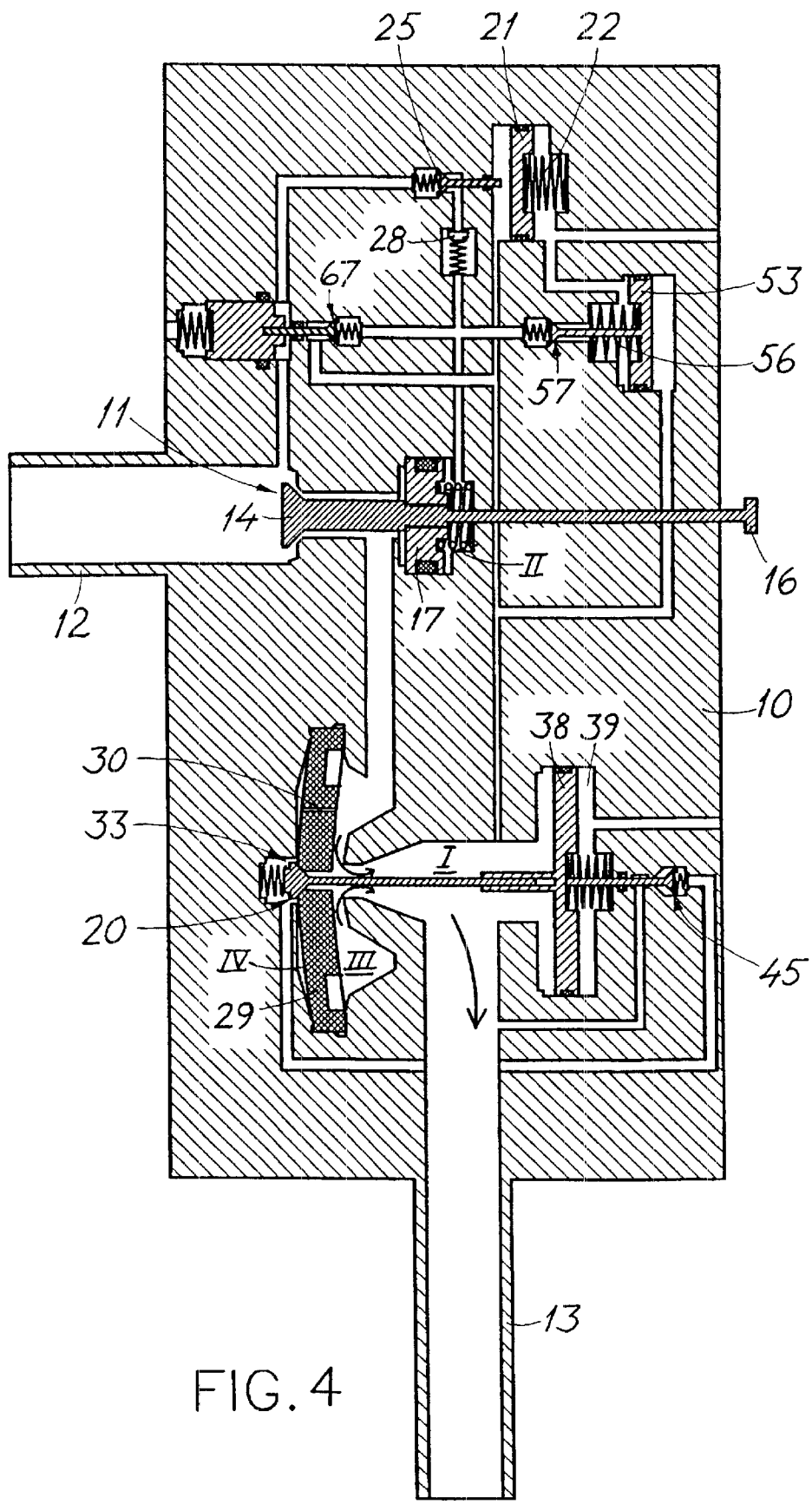

The invention will be further described below in connection with exemplary embodiments with reference to the drawings, wherein FIG. 1 shows a schematic view of a hydraulic system in the form of a fire water system wherein the invention is applied; and FIGS. 2–4 show cross-sectional views of an embodiment of a valve apparatus according to the invention in different functional phases.

FIG. 1 shows a fire water system of the type used on offshore installations. The system comprises pumps 1 which, via a ring line 2, supply water to respective parts of the system's extinguishing plant which is shown to comprise a plurality of extinguishing units 3. In the illustrated system, a valve apparatus 4 according to the invention is connected at the top of the system via a conduit stretch 5. As mentioned in the introduction, this conduit or line stretch may be non-liquid-filled at the start-up of the pumps 1, so that the valve apparatus will communicate with the pipe system via a non-liquid-filled buffer volume 6. The valve apparatus further is coupled to a pressurised gas reservoir which is shown in the form of a pair of gas cylinders 7, for supplying pressurised gas from the reservoir, to counteract pressure impacts when starting up the pumps.

FIGS. 2–4 show a preferred embodiment of a valve apparatus according to the invention. In the preferred embodiment, the valve apparatus is based on servo control in order to achieve a good capacity and to make the valve as little sensitive to variations in the supply pressure as possible. The apparatus comprises a main valve and a regulating unit which in turn comprises a number of valve units arranged in a common housing 10. The main valve 11 communicates with a reservoir (7 in FIG. 1) for high pressure gas via an inlet 12, and the valve units communicate with a buffer volume (6 in FIG. 1) in the relevant hydraulic system via a first valve chamber I and a supply line 13.

The main valve 11 in principle is either closed or open, whereas the regulating unit controls the through-flow of gas. As appears, the servo valves of the main valve and the regulating unit open counter-current, i.e. the valves are pressed towards a tight position by the upstream gas pressure. Every connection between high pressure gas and the supply line and surrounding atmosphere, respectively, of the valve apparatus is based on a valve body sealing against a seat. This implies that one is not dependent on axial seals in order for the valve apparatus to be leakage free.

As shown in FIGS. 2–4, the main valve 11 comprises a valve body 14 which, via a valve stem 15, communicates with a manually actuable operating button 16. On the valve stem 15 there is fixedly placed a piston 17 which is arranged in a cylindrical cavity communicating with a second chamber or main valve chamber II. The piston is under the influence of a spring 18 influencing the main valve body 14 towards an open position. The main valve is connected with the first chamber I via a channel 19 and a gas supply valve 20 forming part of the regulating unit.

The regulating unit comprises, inter alia, a first device which is arranged to open for supply of pressurised gas via the main valve 11 to the first chamber I when the pressure therein sinks below an activating value P1, and thereafter to maintain the pressure in the chamber I at a desired value P2. For this purpose the first device firstly comprises a piston 21 which is influenced by a spring 22 and which is arranged in a cylindrical cavity 23 communicating with the first chamber I via a channel 24. When the pressure in the chamber I is lower than the activating pressure P1, the piston 21 influences a valve 25 which, on the one hand, is connected to the inlet 12 via a channel 26, and on the other hand is connected to the main valve chamber II via a channel 27 in which there is arranged a check valve 28 as shown. Further, the first device comprises the above-mentioned gas supply valve 20 with an associated control valve. The gas supply valve comprises a flexible or resilient disc 29 forming a partition between a third chamber III and a fourth chamber IV, the third chamber III communicating with the main valve 11 via the channel 19, and further communicating with the fourth chamber IV via a narrow passage 30 in the disc 29, for pressure equalisation between these chambers. As appears from the Figures, the resilient disc 29 in a pressure-relieved condition rests against an annular seat 31 at one end of a passage 32 communicating with the first chamber I, so that this chamber is put in connection with the third chamber III when the disc is lifted from the seat.

Said control valve is a first pilot valve 33 having a spring-loaded valve body 34 which co-operates with a seat 35 at one end of a central passage 36 (FIG. 3) through the disc 29, and which, via a connecting rod 37, is connected with a piston 38 which is slidable in a cylindrical cavity 39. The piston 38 is influenced in a first direction by the pressure in the first chamber I, and in the opposite direction by a spring 40, so that the pilot valve opens the passage 36 between the third and fourth chambers III and IV, respectively, when the pressure in the first chamber I falls below the activating pressure P1, and the disc 29 thereby opens for gas supply to the first chamber, the pressure in the fourth chamber IV being relieved via the passage 36. As further described below, the disc 29 will follow the movement of the pilot valve body 34, so that the pressure in the first chamber I therewith is maintained on the desired value P2 determined by the bias of the spring 40.

The regulating unit further comprises a second device causing an increased supply of pressurised gas to the first chamber I when the pressure therein rises after first having fallen to the activating pressure P1, and a third device causing closure of the main valve 11 and thereby shutting-off of the gas flow to the first chamber I when the pressure therein has risen to a closing value P3.

The second device comprises a second pilot valve 45 having a valve body 46 which is coupled to the piston 38 and which, under the influence of this piston, is arranged to open and close a channel connection 47, 48 between the fourth chamber IV and the first chamber I. When the pressure in the first chamber rises after having fallen to the activating pressure P1, the pilot valve 45 is then opened and therewith said channel connection, so that the pressure in the fourth chamber IV falls drastically and causes the disc 29 to open for increased supply of pressurised gas to the first chamber I and therewith to the supply line 13.

The third device comprises a spring-loaded piston 53 which is slidably arranged in a cylindrical cavity 54 and communicates with the first chamber I via a channel 55. The piston 53 is influenced by a spring 56 acting in the opposite direction relative to the pressure in the first chamber I, and it is further coupled to a third pilot valve 57 having a valve body 58 which is arranged to open and close a channel connection 59, 60 between the atmosphere and the second chamber or main valve chamber II. The piston 53 is arranged to open the pilot valve 57 when the pressure in the first chamber I exceeds the closing value P3, so that said channel connection 59, 60 is opened, whereby the pressure in the second chamber falls and the main valve 11 closes instantaneously.

As mentioned above, the gas is supplied from a high pressure reservoir. In principle, the gas flow can be limited in that the gas reservoir is emptied. However, the gas flow through the valve apparatus will be able to be substantially reduced as the pressure in the reservoir falls towards zero. It may therefore be advantageous to use a larger reservoir, and to see to it that the gas supply is broken while there is still a good pressure in the reservoir. The shown embodiment of the valve apparatus is also provided with a device to take care of this function. This device comprises a spring-loaded piston 65 which communicates with the inlet 12 to the main valve 11 via a channel 66, and which is coupled to a fourth pilot valve 67. This valve has a valve body 68 which is arranged to open and close a channel connection 69, 70 between the main valve chamber II and the first chamber I. As long as the supply pressure is high, the piston 65 is pressed to the left in the Figures, and the pilot valve 67 is kept closed. When the supply pressure falls to a predetermined value, the piston 65 is pressed to the right by the spring 71, and the pilot valve opens. Thereby the pressure in the main valve chamber II is vented towards the first chamber I and therewith towards the supply line 13, so that the valve body 14 of the main valve 11 goes to the closed position.

An operating sequence of the valve apparatus will be further described below.

In order to prepare the valve apparatus for operation, the operating button 16 must be pulled to the right as one opens for gas supply to the inlet 12. Thereby the main valve 11 is closed, and it is kept closed, primarily because of the gas supply pressure. In normal passive operation the hydraulic system will be completely liquid-filled, and the pressure in the supply line 13 is so high that the gas supply remains shut off.

When the pressure in the supply line and therewith in the first chamber I falls below the activating pressure P1, the piston 21 will be pressed to the left by the spring 22. This entails that the valve 25 is opened, and that high pressure gas is supplied to the second chamber II via the check valve 28. Thereby the piston 17 of the main valve is pressed to the left, so that the main valve 11 is opened. The spring 40 and the piston 38 will now, in co-operation with the first pilot valve 33 and the resilient disc 29, control the pressure in the supply line 13 to the desired value P2. The passage 30 through the disc 29 is too narrow that it can compensate for the gas leakage arising between the chambers IV and I when the pilot valve 33 is opened. The pressure drop in the chamber IV thereby will cause the resilient disc 29 to be pressed up from its seat 31, as shown in FIG. 3. Thereby there is opened for gas to flow from the chamber III via the underside of the disc 29 and through the passage 32 on to the chamber I. In that the disc is pressed up from its seat, the gas flow between the pilot valve 33 and the upper side of the disc is reduced. In this manner the seat 35 of the disc 29 is forced to follow the movement of the pilot valve 33. The gas flow thereby is controlled in a precise manner from the movement of the pilot valve. The pressure in the chamber I, and therewith in the supply line 13, is kept stable at the desired value P2 which is determined by the bias of the spring 40.

When the pumps of the system start up, the pressure in the supply line 13 will rise. This entails that the piston 38 is pressed to the right and opens the second pilot valve 45. This in turn entails that gas is tapped directly from the fourth chamber IV to the supply line 13. The pressure in this chamber falls drastically, and the resilient disc 29 is pressed further upwards from its seat and opens for maximum gas flow through the valve, as shown in FIG. 4.

The last phase of the regulating sequence is that the regulating unit shuts off the gas flow when a given quantity of gas has been delivered, or when the pressure in the supply line 13 exceeds the closing value P3. If the pressure in the supply line exceeds P3, the force pressing the piston 53 to the right in the Figures will exceed the tension of the spring 56. This causes the pilot valve 57 to be opened, and that gas is tapped from the main valve chamber II to the surrounding atmosphere. Consequently, the main valve body 14 is pressed to the closed position, and the gas flow through the valve apparatus is shut off instantaneously. The pressure in the valve inlet 12 will now see to it that the valve remains in the closed position until the supply pressure disappears, or the pressure in the supply line 13 again falls below the activating pressure P1.

What is claimed is:

1. A method for counteracting harmful pressure pulses caused by rapid retardation of a liquid in a hydraulic system in which the liquid is supplied from a pump to a conduit stretch containing a non-liquid-filled volume, comprising the steps of sensing the pressure in said volume in the conduit, supplying compressed gas to the volume when the pressure sinks below a given first level, and maintaining the pressure at a desired value which is at least equal to the first level, supplying an increased quantity of compressed gas to said volume when the pressure therein, as a result of an external influence, rises after having fallen to the first level, and shutting-off the supply of compressed gas to the volume when the pressure therein has risen to a given second level.

2. A method according to claim 1, wherein the supply of compressed gas is shut off after a predetermined gas quantity has been supplied to the volume.

3. A valve apparatus for counteracting harmful pressure pulses causes by rapid retardation of a liquid in a hydraulic system comprising a pump for the supply of liquid to a conduit stretch containing a non-liquid-filled volume, comprising:

a main valve having an inlet connected to a reservoir for pressurized gas, a first valve chamber connected to said volume, and a regulating unit for controlling the supply of pressurized gas to the first chamber, which unit comprises a first device arranged to open for the supply of pressurized gas via the main valve to the first chamber when the pressure therein sinks below an activating value, and thereafter to maintain the pressure in the chamber at a desired value, a second device causing an increased supply of pressurized gas to the first chamber when the pressure therein rises after having fallen to the activating pressure, and a third device causing closing of the main valve and therewith shutting-off of the gas flow to the first chamber when the pressure therein has risen to a closing value.

4. A valve apparatus according to claim 3, wherein the first device comprises a spring-loaded piston which communicates with the first chamber and which, when the pressure in the chamber is lower than the activating pressure, influences a valve opening for the supply of pressurised gas to a main valve chamber behind a piston then causing opening of the main valve.

5. A valve apparatus according to claim 4, wherein the first device comprises a gas supply valve comprising a resilient disc forming a partition between a third chamber and a fourth chamber, the third chamber communicating with the main valve and the disc containing a narrow passage for pressure equalisation between the chambers and in a pressure-relieved condition closing for gas supply from the third to the first chamber, and that there is provoked a first pilot valve which is coupled to a piston influenced in a first direction by the pressure in the first chamber and in an opposite direction by a spring, so that the pilot valve opens a passage between the third and fourth chambers when the pressure in the first chamber falls below the activating pressure, and the disc thereby opens for gas supply to the first chamber, and so that the disc follows the movement of the pilot valve and the pressure in the first chamber thereby is maintained at a desired value determined by the bias of the spring.

6. A valve apparatus according to claim 4, wherein the third device comprises a spring-loaded piston communicating with the first chamber and being coupled to a pilot valve, the piston being arranged to open the pilot valve when the pressure in the first chamber exceeds the closing value, the pilot valve opening a connection between the atmosphere and the main valve chamber behind the piston of the main valve, so that the main valve is instantaneously closed.

7. A valve apparatus according to claim 6, further comprising a spring-loaded piston communicating with the inlet to the main valve and being coupled to a pilot valve, the piston being arranged to open the pilot valve when the gas supply pressure falls below a predetermined value, and the pilot valve opening a connection between the atmosphere and the main valve chamber behind the piston of the main valve, so that the main valve is closed.

8. A valve apparatus according to claim 4, further comprising a spring-loaded piston communicating with the inlet to the main valve and being coupled to a pilot valve, the piston being arranged to open the pilot valve when the gas supply pressure falls below a predetermined value, and the pilot valve opening a connection between the atmosphere and the main valve chamber behind the piston of the main valve, so that the main valve is closed.

9. A valve apparatus according to claim 3, wherein the first device comprises a gas supply valve comprising a resilient disc forming a partition between a second chamber and a third chamber, the second chamber communicating with the main valve and the disc containing a narrow passage for pressure equalization between the chambers and in a pressure-relieved condition closing for gas supply from the second chamber to the first chamber, and that there is provoked a first pilot valve which is coupled to a piston influenced in a first direction by the pressure in the first chamber and in an opposite direction by a spring, so that the pilot valve opens a passage between the second and third chambers when the pressure in the first chamber falls below the activating pressure, and the disc thereby opens for gas supply to the first chamber, and so that the disc follows the movement of the pilot valve and the pressure in the first chamber thereby is maintained at a desired value determined by the bias of the spring.

10. A valve apparatus according to claim 9, wherein the spring-loaded piston is also a coupled to a second pilot valve and causes the opening thereof when the pressure in the first chamber rises after having fallen to the activating pressure, the second pilot valve opening a connection between the third and the first chamber, so that the pressure in the fourth chamber falls drastically and causes the disc to open for increased supply of pressurized gas to the third chamber.

* * * * *